US012127073B2

(12) United States Patent
Umezawa

(10) Patent No.: US 12,127,073 B2
(45) Date of Patent: Oct. 22, 2024

(54) INTEGRATION OF DIGITAL HISTORY WITH VISITS TO PHYSICAL VENUES

(71) Applicant: Zenreach, Inc., San Francisco, CA (US)

(72) Inventor: Kai Umezawa, San Francisco, CA (US)

( * ) Notice: Subject to any disclaimer, the term of this patent is extended or adjusted under 35 U.S.C. 154(b) by 428 days.

(21) Appl. No.: 17/469,718

(22) Filed: Sep. 8, 2021

(65) Prior Publication Data

US 2023/0069840 A1 Mar. 9, 2023

(51) Int. Cl.
*H04W 4/029* (2018.01)
*H04L 67/306* (2022.01)

(52) U.S. Cl.
CPC .......... *H04W 4/029* (2018.02); *H04L 67/306* (2013.01)

(58) Field of Classification Search
CPC ....... H04L 67/02; H04L 67/52; H04L 67/306; H04L 67/535; H04L 67/34; H04L 67/568; H04L 51/52; H04L 63/102; H04L 67/303; H04L 51/04; H04L 67/564; H04L 63/1416; H04L 63/1425; H04L 63/0853; H04L 9/32; H04L 41/0803; H04W 4/029; H04W 4/02; H04W 4/021; H04W 4/80; H04W 64/00; H04W 4/027; H04W 4/025; H04W 4/33; H04W 4/21; H04W 88/02; H04W 84/12; H04W 4/024; H04W 4/50; H04W 12/02; H04W 64/003; H04W 8/005; H04W 24/02; H04W 12/63; H04W 88/08; H04W 12/64; H04W 36/32; H04W 52/0229; H04W 28/0268; H04W 60/04
See application file for complete search history.

(56) References Cited

U.S. PATENT DOCUMENTS 11,381,962 B1 * 7/2022 Mohan ............... H04W 12/02
11,778,457 B2 * 10/2023 Mohan ............... H04W 4/029
                                                        455/411
2004/0219932 A1  11/2004 Verteuil
2008/0248815 A1  10/2008 Busch
(Continued)

OTHER PUBLICATIONS

PCT International Search Report and Written Opinion, PCT Patent Application No. PCT/US2022/014397, Apr. 26, 2022, 24 pages.
(Continued)

*Primary Examiner* — Nizar N Sivji
*Assistant Examiner* — Jing Gao
(74) *Attorney, Agent, or Firm* — Fenwick & West LLP

(57) ABSTRACT

A device detection system integrates location data with online tracking data describing content viewed by a user. The device detection system is configured to determine whether a device is located within a venue. The device detection system provides user identifiers to an identity matching server. An entity associated with the venue may provide online tracking data obtained via a tracking pixel to the identity matching server. The identity matching server provides the tracking data and anonymous identifiers to the device detection system which correspond to the device user identifiers. The device detection system generates a customer journey timeline that describes the location data and online tracking data for a user. The device detection system or the entity may use the information in the customer journey timeline to modify or select digital content to provide to users.

18 Claims, 5 Drawing Sheets

(56) References Cited

U.S. PATENT DOCUMENTS

| | | | |
|---|---|---|---|
| 2011/0055005 A1* | 3/2011 | Lang | G06Q 30/0247 |
| | | | 705/14.46 |
| 2012/0130796 A1 | 5/2012 | Busch | |
| 2013/0204697 A1 | 8/2013 | Boal | |
| 2014/0331272 A1 | 11/2014 | Gupta et al. | |
| 2015/0019322 A1 | 1/2015 | Alla et al. | |
| 2015/0348095 A1 | 12/2015 | Dixon et al. | |
| 2016/0283989 A1* | 9/2016 | Esquilla, Jr. | G06Q 30/0281 |
| 2016/0295372 A1 | 10/2016 | Kapicioglu et al. | |
| 2017/0006434 A1 | 1/2017 | Howe et al. | |
| 2017/0257454 A1 | 9/2017 | Hughes et al. | |
| 2017/0316281 A1 | 11/2017 | Criminisi et al. | |
| 2018/0329990 A1 | 11/2018 | Severn et al. | |
| 2018/0332136 A1* | 11/2018 | Narasimhan | H04L 69/22 |
| 2018/0352384 A1* | 12/2018 | Rehman | G01S 5/02 |
| 2019/0069147 A1 | 2/2019 | Charlton et al. | |
| 2019/0228455 A1 | 7/2019 | Kumar et al. | |
| 2019/0268721 A1 | 8/2019 | Tellado et al. | |
| 2020/0005356 A1 | 1/2020 | Greenberger et al. | |
| 2020/0133955 A1 | 4/2020 | Padmanabhan et al. | |
| 2020/0320576 A1 | 10/2020 | Harrison | |
| 2021/0004437 A1 | 1/2021 | Zhang et al. | |
| 2021/0136514 A1 | 5/2021 | Shaposhnikov et al. | |
| 2021/0173916 A1 | 6/2021 | Ortiz et al. | |
| 2022/0248166 A1 | 8/2022 | Isaacson et al. | |

OTHER PUBLICATIONS

United States Office Action, U.S. Appl. No. 17/370,967, filed Jul. 19, 2023, 19 pages.
PCT International Search Report and Written Opinion, PCT Application No. PCT/US2022/014398, Feb. 23, 2022, eight pages.
United States Office Action, U.S. Appl. No. 17/164,246, filed Mar. 27, 2023, 27 pages.
United States Office Action, U.S. Appl. No. 17/370,967, filed Jan. 26, 2023, 25 pages.
United States Office Action, U.S. Appl. No. 17/833,244, filed Dec. 21, 2022, 11 pages.
United States Office Action, U.S. Appl. No. 17/164,258, filed Jan. 5, 2022, eight pages.
Safegraph, "Determining Points of Interest Visits From Location Data: A Technical Guide to Visit Attribution," 2021, Retrieved from the internet <URL:https://www.safegraph.com/guides/visit-attribution-white-paper>.
United States Office Action, U.S. Appl. No. 17/164,246, filed Sep. 8, 2023, 34 pages.
United States Office Action, U.S. Appl. No. 17/164,246, filed Dec. 28, 2023, 34 pages.
Zola, A. "What is a Ping," Tech Target Network, Jul. 2021, 6 pages, Retrieved from the internet <URL:https://www.techtarget.com/searchnetworking/definition/ping>.

* cited by examiner

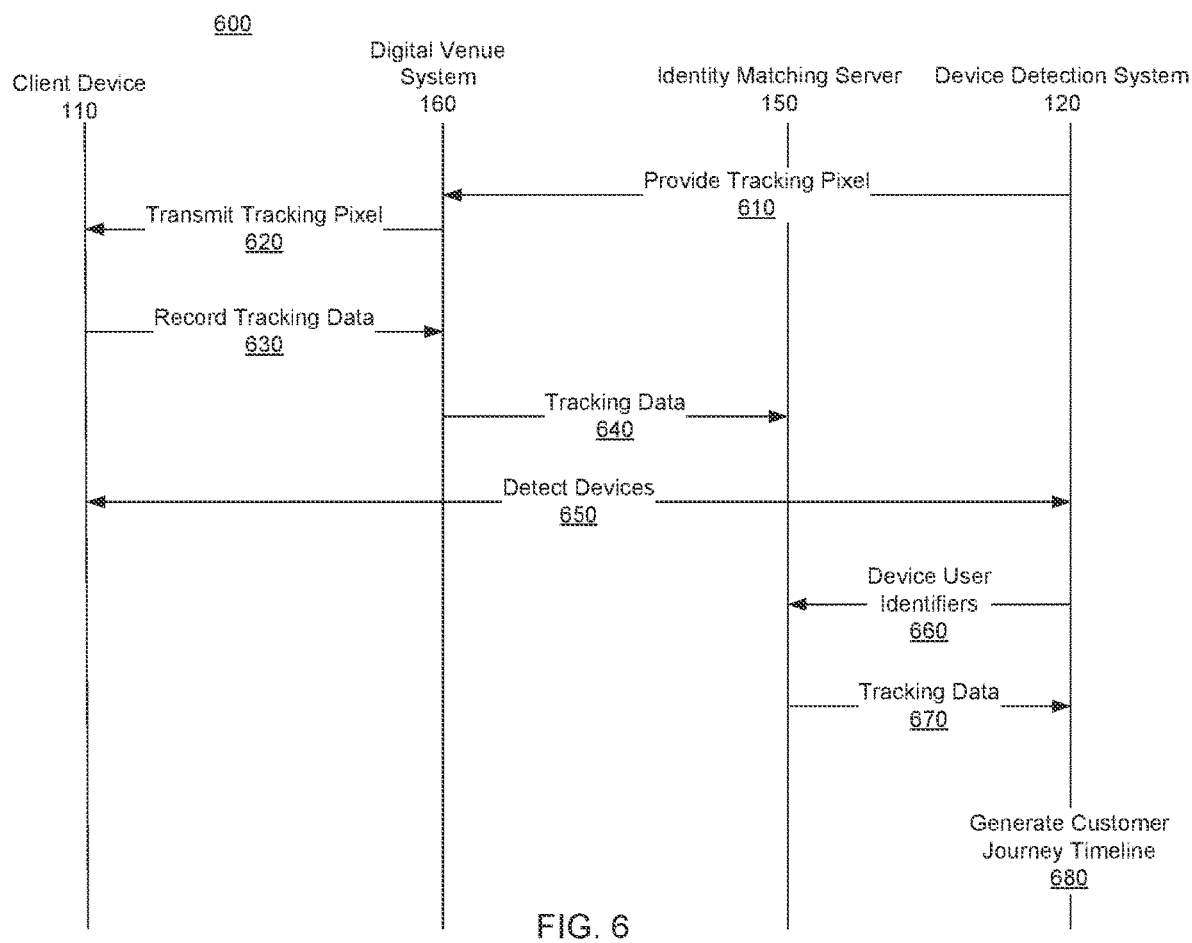

INTEGRATION OF DIGITAL HISTORY WITH VISITS TO PHYSICAL VENUES

BACKGROUND

This disclosure relates generally to machine-learning technology, and more specifically to machine-learning technology for obtaining and combining a customer's online activity with the customer's physical in-store activity.

It is useful for entities to understand a customer's complete journey between a physical venue and a website for the venue. For example, it may be useful to know if a customer visited a venue of an entity and subsequently purchased an item from a website or the entity, or if a customer visited the website of the entity and subsequently came to the venue in person to purchase an item. Similarly, it may be useful to determine which website content is more likely to result in a customer visiting a physical venue. Such information may be useful for entities to understand whether digital content distribution results in increased foot traffic within the venue. Typical systems for tracking foot traffic may utilize GPS technology, social media check-ins, or other methods of locating customers. Many of these systems require a customer to perform an action, such as to enable GPS tracking of the device or interact with an application on the device. Additionally, it can be difficult for an entity to determine based on GPS data whether a customer is located within a venue or nearby but outside the venue. Furthermore, many systems and customers do not permit third-party tracking cookies which track a customer's online activity. Thus, it may be difficult to understand a customer's journey between online activity and visits to a physical venue.

SUMMARY

The systems described herein integrate location data obtained via a device detection system with online tracking data describing content viewed by a user. The device detection system is configured to determine whether a device is located within a venue. The device detection system provides user identifiers to an identity matching server. An entity associated with the venue may provide online tracking data obtained via a tracking pixel to the identity matching server. The identity matching server provides the tracking data and anonymous identifiers to the device detection system which correspond to the device user identifiers. The device detection system generates a customer journey timeline that describes the location data and online tracking data for a user. The device detection system or the entity may use the information in the customer journey timeline to modify or select digital content to provide to users.

In some embodiments, the system is configured to transmit a tracking pixel to a digital venue system. The tracking pixel is configured to obtain tracking data from a client device, such as a browsing history of the device, for transmission to an identity matching server. The system may detect, by a wireless access point of a venue, a ping from a device. The system may determine, based on the ping, that the device is located within the venue. The system may obtain a device user identifier associated with a user of the device. The system may transmit the device user identifier to the identity matching server. The system may receive, from the identity matching server, an anonymous identifier corresponding to the device user identifier. The system may receive, from the identity matching server, the tracking data obtained via the tracking pixel. The system may generate a customer journey timeline for the user describing the tracking data and the detection of the device within the venue.

In some embodiments, the system is configured to detect, by a wireless access point located within a venue associated with an entity, a ping from a first client device associated with a user. The system may determine, based on the ping, location data indicating that the client device is located within the venue. The system may receive, from the entity, online tracking data of the user obtained via a tracking pixel on a second client device associated with the user. The system may map the location data for the first device to the online tracking data for the second device. The system may generate a customer journey timeline describing the location data and the online tracking data.

BRIEF DESCRIPTION OF THE DRAWINGS

FIG. 6 is an action diagram of a method for integrating online activity with physical venue location data, according to an embodiment.

Figure 1:
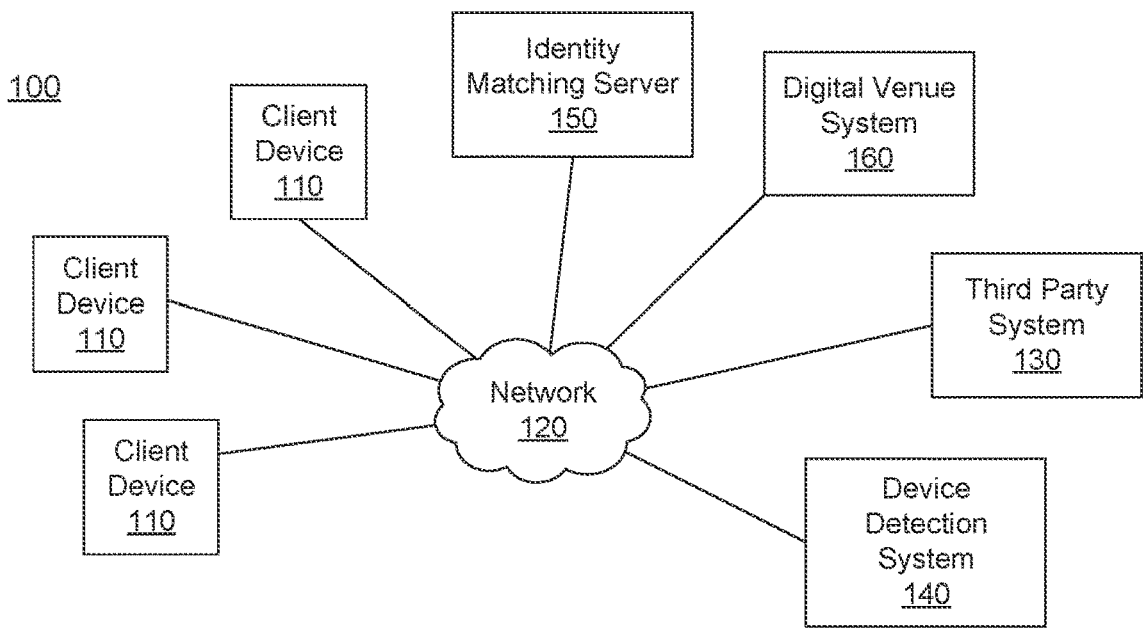
FIG. 1 is a block diagram of a system environment in which a device detection system operates, according to an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

It is beneficial for entities to know whether a customer that was presented digital content related to an entity associated with a venue visits the venue. Similarly, it is beneficial to know whether a customer that visits a venue subsequently visits a website or application of an entity associated with the venue and makes a purchase from the entity. Device detection systems described herein detect wireless pings from mobile devices. The device detection systems obtain device parameters from the wireless pings, such as a signal strength of a ping, a time of the ping, a dwell time between a first ping and a last ping from a device, whether the ping was received during hours of operation of the venue, a signal strength of pings from other devices that connected to the wireless access point, a manufacturer identifier of a media access control (MAC) address of the device, and characteristics of data received from employee devices. The device detection systems evaluate the device parameters to uniquely identify mobile devices that entered the venue.

The entity places a tracking pixel (also referred to as a cookie) on a website for the venue displayed to a customer. The tracking pixel may be provided to the entity by a third party system, which may be operated by the same or a different entity as the entity operating the device detection system. The entity may upload the data obtained via the tracking pixel to an identity matching server. The data may include the browsing history and information identifying the customer, such as a device identifier or an email address of the customer.

The device detection system provides device user identifiers to the identity matching server for devices that were detected within the venue. The identity matching server maps the device user identifiers to the tracking pixel data for customers that visited the venue. The identity matching server provides the tracking pixel data for the identified customers to the device detection system. In some embodiments, the identity matching server anonymizes the data prior to providing the tracking pixel data to the device detection system. The device detection system may combine the tracking pixel data with the physical venue visits for each customer to obtain the customer's journey between online activity and physical venue visits. The device detection system may generate a customer journey timeline describing the customer journey and provide the customer journey timeline to the entity. The customer journey timeline may comprise recommendations for modifying a website or modifying content provided to the customer by a content distribution system.

System Architecture

FIG. 1 is a block diagram of a system environment 100 for a device detection system 140. The system environment 100 shown by FIG. 1 comprises one or more client devices 110, a network 120, one or more third-party systems 130, a device detection system 140, an identity matching server 150, and an digital venue system 160. In alternative configurations, different and/or additional components may be included in the system environment 100.

The client devices 110 are one or more computing devices capable of transmitting a detectable signal to the device detection system 140. In one embodiment, a client device 110 may be a device having computer functionality, such as a mobile telephone, a smartphone, a laptop, an automobile with an onboard computer system, or another suitable device. A client device 110 is configured to communicate via the network 120.

The client devices 110 are configured to communicate via the network 120, which may comprise any combination of local area and/or wide area networks, using both wired and/or wireless communication systems. The network 120 may comprise a wireless access point located within a venue. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the device detection system 140, which is further described below in conjunction with FIG. 2. In one embodiment, a third party system 130 is a content provider (such as a video cloud server, an advertising server, an image database, and the like) configured to provide content directly or indirectly to a client device 110. In other embodiments, a third party system 130 provides content or other information for presentation via a client device 110. A third party system 130 may also communicate information to the device detection system 140, such as content items (such as images, media, advertisements, text messages, and the like), information describing content items that were previously provided to the client devices 110, or information about an application provided by the third party system 130. The third party system 130 may target the content items based on user attributes stored by the third party system 130. For example, the user attributes may comprise demographic information, such as user ages, genders, income levels, locations, etc. In some embodiments, the user attributes may comprise information obtained via a tracking pixel, such as browsing history, clickstream data, or other browsing activity.

The device detection system 140 is configured to determine whether a client device 110 entered a venue. The device detection system 140 may comprise a combination of hardware and software. In some embodiments, the device detection system 140 may comprise a cloud computing system. All or a portion of the device detection system 140 may be located external to a venue. In some embodiments, the device detection system 140 may be located within a venue. The device detection system 140 may be in communication with an access point located within a venue. The access point may be a component of the device detection system 140. The device detection system 140 is further described with respect to FIGS. 2-6.

The identity matching server 150 is configured to receive tracking pixel data from the digital venue system 160 and device user identifiers from the device detection system. The identity matching server 150 is configured to map the tracking pixel data to the device user identifiers for each customer. The identity matching server 150 may store user profiles that comprise information describing a user or device, such as a name, email address, phone number, MAC address, cookie value, phone number, residential address, etc. Based on the tracking pixel data received from the digital venue system 160, the identity matching server 150 is able to match the tracking pixel data to the stored user profile. Based on the device user identifier received from the device detection system, the identity matching server 150 is able to match the device user identifier to the stored user profile. Each user profile may be associated with multiple devices associated with a customer, such as a cellphone, a laptop, a desktop, etc. The identity matching server 150 may provide the tracking pixel data and matched device user identifiers to the device detection system 140, the digital venue system 160, or some combination thereof.

The digital venue system 160 is configured to provide a digital interface for a customer to interact with an entity. For example, the digital venue system 160 may provide a website or mobile application for an entity. An entity may refer to a company, organization, or individual associated with a physical venue location. The entity may operate one or more physical venues in which the device detection system 140 may detect client devices 110. The digital venue system 160 is configured to transmit tracking pixel data to the third party system 130, the device detection system 140, or some combination thereof.

Figure 2:
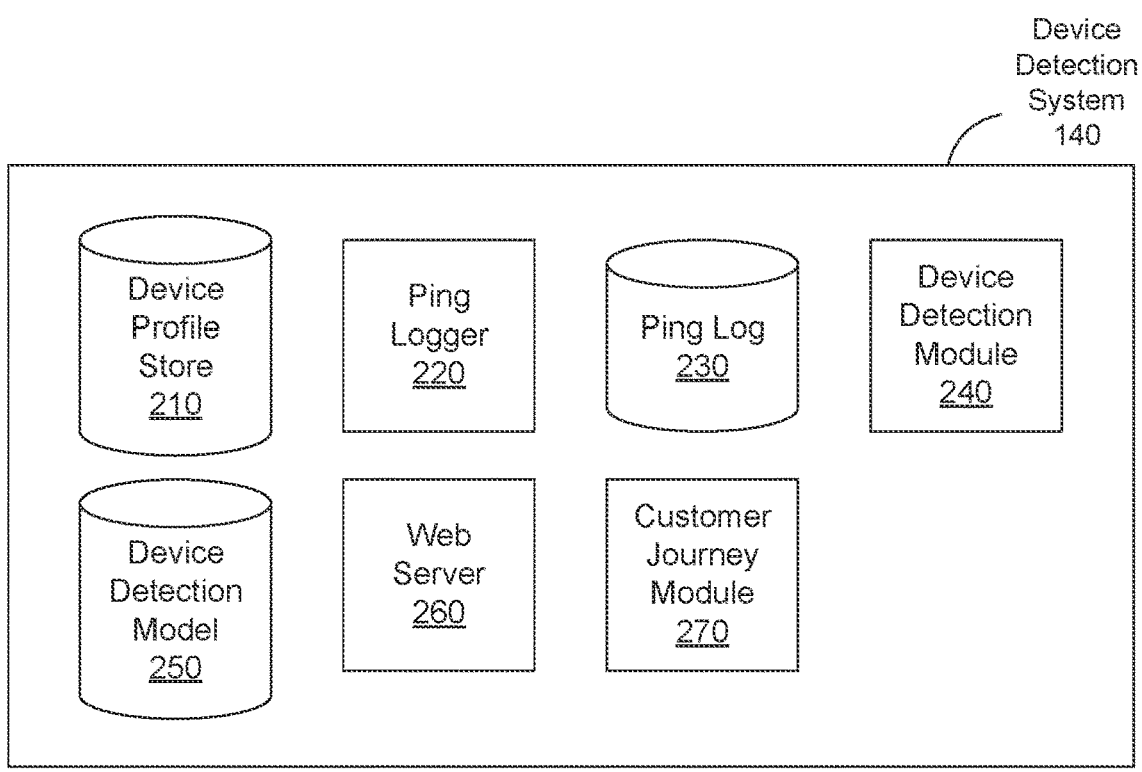
FIG. 2 is a block diagram of a device detection system, according to an embodiment.

FIG. 2 is a block diagram of an architecture of the device detection system 140. The device detection system 140 shown in FIG. 2 includes a device profile store 210, a ping logger 220, a ping log 230, a device detection module 240, a device detection log 250, a web server 260, and a customer journey module 270. In other embodiments, the device detection system 140 may include additional, fewer, or different components for various applications. Conventional components such as network interfaces, security functions, load balancers, failover servers, management and network operations consoles, and the like are not shown so as to not obscure the details of the system architecture.

The device detection system 140 is configured to determine whether a client device 110 entered a venue. The device detection system 140 may be associated with multiple venues. A venue refers to a physical location of an entity, such as a retail store, a restaurant, a museum, a merchant location, a service provider, etc. Each venue is associated with one or more geographic boundaries.

The device profile store 210 is configured to store profiles for a plurality of devices. The device profile store 210 may comprise one or more databases. A device profile includes information about a device or a user associated with the device that was explicitly shared by the user and may also include profile information inferred by the device detection system 140. In one embodiment, a device profile includes multiple data fields, each describing one or more attributes of the corresponding device or user. Examples of information stored in a device profile include a MAC address, an email address, phone number, username, password, a description of content items provided to the device, etc. A device profile in the device profile store 205 may also maintain references to actions by the corresponding user performed on the device, such as clicking on a content item.

A device profile may be created in the device profile store 210 based on various actions. In some embodiments, a device profile may be created in response to a device connecting to an access point of any of a plurality of venues. The venue may require that a user provide an email address, username, or other identifying info to connect to a wireless network provided by an access point. The device detection system 140 may obtain additional information, such as the MAC address, from the device. In some embodiments, a device profile may be created in response to the device detection system 140 detecting a ping from the device, regardless as to whether the device connected to a wireless network. The device detection system 140 may obtain a MAC address for the device, and if the device profile store 210 does not contain a device profile with a corresponding MAC address, the device profile store 210 may create a new device profile. In some embodiments, the device detection system 140 may obtain device profile from third parties, such as by purchasing device profile data, and the device profile store 210 may create new device profiles for the devices. Each time a device is detected by the device detection system 140 at any venue, the device detection system 140 may access the device profile to obtain the information contained in the device profile.

The ping logger 220 is configured to detect pings from mobile devices. The pings may comprise, for example, WiFi pings, Bluetooth pings, 3G/4G/5G pings, or any other suitable type of pings. The pings may be sent out by mobile devices at regular intervals or may be sent in response to a signal from the device detection system 140 or an access point associated with a venue. The ping logger 220 collects various parameters associated with the detected pings. The parameters may comprise a MAC address of the device, a time of the ping, and a signal strength of the ping. The ping logger 220 infers additional parameters regarding the ping, such as determining a device manufacturer based on the MAC address of the device. The ping logger 210 is configured to store the parameters in the ping log 230.

The ping log 230 is configured to store a history of pings and associated parameters detected by the device detection system. For each device profile in the device profile store 210, the ping log 230 stores data describing each ping detected from the devices. The ping log 230 may also store device parameters from the device profiles stored in the device profile store 210. The ping log 230 may store a time of the first ping and a time of the last ping detected from a device. The ping log 230 may calculate a dwell time based on a difference between the first ping time and the last ping time.

The device detection module 240 is configured to determine whether a detected device is located within a venue. The device detection module 240 is configured to generate the device detection model 250. In some embodiments, the device detection module 240 applies machine learning techniques to generate the device detection model 250 that, when applied to pings stored in the ping log 230, outputs indications of whether the device is located within a venue, such as probabilities that the pings have a particular Boolean property, or an estimated value of a scalar property.

As part of the generation of the device detection model 250, the device detection module 240 forms a training set of data including pings by identifying a positive training set of pings that have been determined to be received from a device located within a venue, and, in some embodiments, forms a negative training set of data including pings that have been determined to be received from a device not located within the venue.

The device detection module 240 extracts feature values from the pings of the training set, the features being variables deemed potentially relevant to whether or not the pings were received from a device located within the venue. Specifically, the feature values extracted by the device detection module 240 include a signal strength of a ping, a time of the ping, a dwell time between a first ping and a last ping from a device, whether the ping was received during hours of operation of the venue, a signal strength of pings from other devices that connected to the wireless access point, a manufacturer identifier of a MAC address of the device, and characteristics of data received from employee devices. An ordered list of the features for a ping is herein referred to as the feature vector for the ping. In one embodiment, the device detection module 240 applies dimensionality reduction (e.g., via linear discriminant analysis (LDA), principle component analysis (PCA), or the like) to reduce the amount of data in the feature vectors for pings to a smaller, more representative set of data.

In some embodiments, the device detection module 240 uses supervised machine learning to train the device detection model 250, with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The device detection model 250, when applied to the feature vector extracted from a ping, outputs an indication of whether the ping was received from a device within the venue, such as a Boolean yes/no estimate, or a scalar value representing a probability.

In some embodiments, a validation set is formed of additional pings, other than those in the training sets, which have already been determined to have been received from a device located within or outside of a venue. The device detection module 240 applies the trained validation device detection model 250 to the pings of the validation set to quantify the accuracy of the device detection model 250. Common metrics applied in accuracy measurement include: Precision=TP/(TP+FP) and Recall=TP/(TP+FN), where precision is how many the device detection model 250 correctly predicted (TP or true positives) out of the total it predicted (TP+FP or false positives), and recall is how many the device detection model 250 correctly predicted (TP) out of the total number of pings that were received from a device located within a venue (TP+FN or false negatives). The F score (F-score=2*PR/(P+R)) unifies precision and recall into a single measure. In one embodiment, the device detection module 240 iteratively retrains the device detection model 250 until the occurrence of a stopping condition, such as the accuracy measurement indication that the model is sufficiently accurate, or a number of training rounds having taken place.

In some embodiments, the device detection model 250 may comprise a statistical model. Each device parameter may be assigned a score, such as a score from 1-100. Each device parameter may also be assigned a numerical weight, such as from 0-10. A weighted score may be calculated by combining the numerical weight with the parameter score, such as by multiplying the parameter score by the numerical weight. The weighted scores for all device parameters may be combined, such as by addition or averaging. The device detection module 240 may apply the device detection model 250 to pings in the ping log 230, and the device detection module may output a score representing a confidence value that the pings were received from a device located within a venue.

The web server 260 links the device detection system 140 via the network 120 to the one or more client devices 110, as well as to the one or more third party systems 130, the identity matching server 150, and the digital venue system 160. One or more of the client devices 110 may be operated by a human or software device detection analyst. The device detection analyst may review device parameters and results output by the device detection system 140. The web server 260 serves web pages, as well as other content, such as JAVA®, FLASH®, XML and so forth. The device detection analyst may provide instructions to the device detection system 140 via the web server 260 to modify parameters of the device detection module 250 or to retrain the device detection model 250.

The customer journey module 270 is configured to generate customer journey timelines for users that viewed digital content provided by an entity and visited a venue associated with the entity. The customer journey module 270 retrieves a set of device user identifiers from the device profile store 210. The device user identifiers may comprise an email address associated with the device, a MAC address of the device, a phone number associated with the device, a username, or some other identifying information describing a user or device. The customer journey module 270 may retrieve device user identifiers for devices that were determined by the device detection module 240 to have visited the venue. The customer journey module 270 may select device user identifiers for devices that visited the venue during a limited time period, such as during a certain day or certain week.

The customer journey module 270 is configured to transmit the selected set of device user identifiers to the identity matching server 150. The customer journey module 270 may provide a list of times that the devices were detected at a venue. The customer journey module 270 may provide additional information to the identity matching server 150, such as purchases made by a user of the device or specific locations within a venue that the device was detected. The customer journey module 270 is configured to receive a set of anonymous identifiers from the identity matching server. The customer journey module 270 may receive tracking data associated with each of the set of anonymous identifiers. Each anonymous identifier may correspond to one of the device user identifiers. However, the anonymous identifiers may not contain information that allows the device detection system 140 to determine which anonymous identifier corresponds to which device.

In some embodiments, the customer journey module 270 is configured to receive tracking data from the digital venue system 160. The customer journey module 270 is configured to map the tracking data to the device user identifiers detected within a venue associated with the digital venue system 160. In some embodiments, the customer journey module 270 may receive demographic information associated with the anonymous identifiers, such as user ages, genders, income levels, locations, etc.

The customer journey module 270 is configured to generate a customer journey timeline for each device detected by the device detection system 120. The customer journey timeline may describe the sequence of events including each time the device visited a venue and each time the user of the device accessed digital content provided by the digital venue system 160. The customer journey timeline may describe each webpage and content item viewed or clicked on by the user. The customer journey timeline may describe any purchases made by a user and whether the purchase was completed in a physical venue or via digital content provided by the digital venue system. Thus, the customer journey timeline may provide a complete picture of a user's interactions with an entity, including online activity as well as in-person activity at a venue associated with the entity. In some embodiments, the customer journey module 270 may provide suggestions to the entity regarding specific actions the entity may take to improve a metric of the entity. For example, the customer journey module 270 may suggest certain changes the entity may make to a website to increase foot traffic into a venue.

Figure 3:
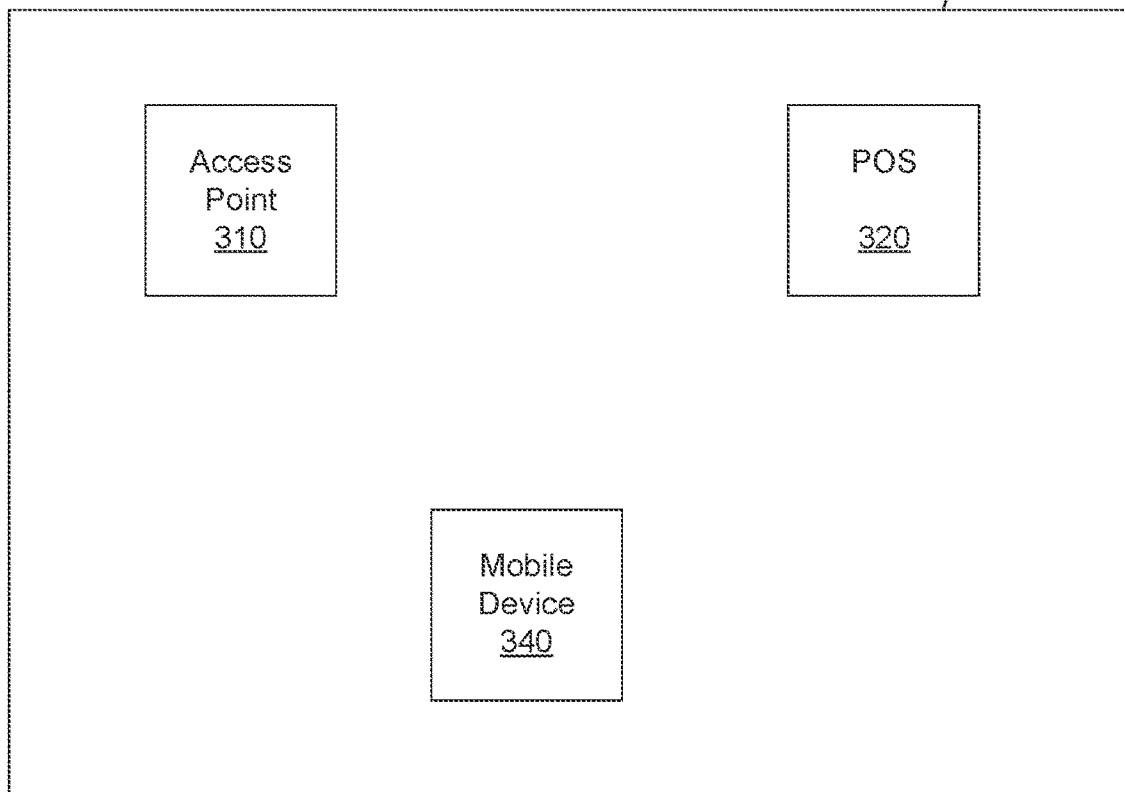
FIG. 3 is a schematic diagram of a device detection system operating within a venue, according to an embodiment.

FIG. 3 illustrates a schematic diagram of a device detection system, such as the device detection system 140 of FIG. 2, operating within a venue 300. The venue 300 comprises an access point 310, a POS 320, and a venue boundary 330. A first mobile device 340 is located within the venue boundary 330, and a second mobile device 350 is located outside of the venue boundary 330.

The venue boundary 330 defines an area within which a mobile device is determined to be located within the venue 300. In some embodiments, the boundary may comprise a physical structure, such as: the walls, floor, and ceiling of a venue; a fenced area; or the edges of a paved area surrounding a structure. In some embodiments, the venue 300 may comprise one or more areas within the venue 300 defined by different boundaries. For example, a restaurant may comprise a bar area defined by a boundary around the bar, and a seating area defined by boundaries around the seating area.

Similar, a grocery store or retail store may comprise boundaries around each department within the venue, such as boundaries around a floral department, clothing department, produce department, etc. In some embodiments, the boundary may comprise a legal boundary, such as the property lines of a property on which a venue is located. In some embodiments, the boundary may be defined by a distance from a point, such as a radius from the access point. Different types of boundaries may be useful for different types of venues. For example, for a retail store inside of a crowded mall, the boundaries may be defined to be the walls of the retail store. For a food truck, the boundary may be defined to be any area within 20 feet of an access point of the food truck.

The access point 310 is configured to provide a wireless LAN. The access point 310 is configured to detect pings from the mobile device 340 and the mobile device 350. In some embodiments, one or more of the mobile devices 340, 350 may connect to the wireless LAN provided by the access point 310.

The device detection system is configured to determine, by applying one or more models as described herein to information associated with the pings detected from the mobile devices 340, 350, whether the mobile devices are located within the venue boundary 330. In some embodiments, a user of the mobile device 340 may conduct a transaction at the POS 320. The device detection system may use the transaction as an input to a device detection model, such as the device detection model 250 of FIG. 2, to determine whether the mobile device 340 is located within the venue boundary 330. In some embodiments, the device detection system may use the transaction as a ground truth confirmation that the mobile device 340 is located within the venue boundary 330.

Method for Generating a Device Detection Model

Figure 4:
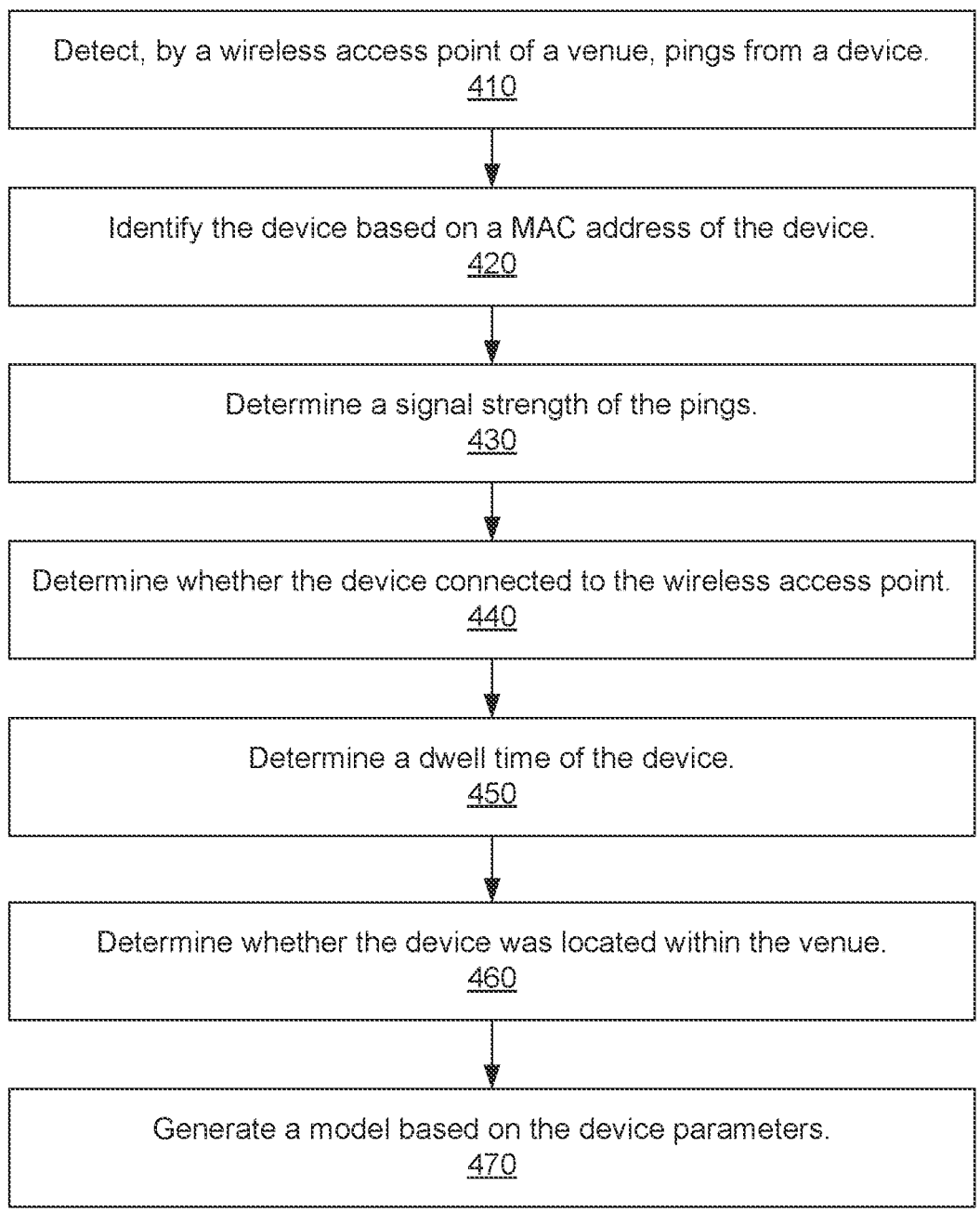
FIG. 4 is a flowchart of a method for training a machine-learning model for detecting a location of a device, according to an embodiment.

FIG. 4 is a flowchart 400 of a method for generating a device detection model, in accordance with an embodiment. In various embodiments, the method includes different or additional steps than those described in conjunction with FIG. 4. Further, in various embodiments, the steps of the method may be performed in different orders than the order described in conjunction with FIG. 4. The method described in conjunction with FIG. 4 may be carried out by the device detection system 140 in various embodiments.

The device detection system detects 410 pings from a device. The pings may be detected by a wireless access point located within a venue. In some embodiments, the pings may be detected by multiple wireless access points located within the venue. The pings may be detected from devices located within the venue, as well as from devices located outside the venue. The pings may be detected during a baseline time period. For example, a baseline time period may comprise a week, a day, or any other suitable length of time to train a device detection model.

The device detection system identifies 420 a device based on a MAC address of the device. Each ping detected from a device may comprise a MAC address that uniquely identifies the device. Any subsequent pings detected from the device may be grouped with all pings containing the specific device to create a set of pings associated with the device.

The device detection system determines 430 a signal strength of the pings. The signal strength may be proportional to the distance from the device to the wireless access point. Thus, a stronger signal strength may indicate that the device is relatively closer to the wireless access point and more likely to be located within the venue. For example, a signal strength of a first value may indicate that a device is closer to the wireless access point than a signal strength of a second value lower than the first value. In some embodiments, the device detection system determines a different signal strength from different wireless access points within the venue, and the device detection system may calculate possible device locations based on the different signal strengths.

The device detection system may determine 440 whether the device connected to the wireless access point. The wireless access point provides a wireless LAN that devices may connect to. A user of the access point may be prompted to provide a username, email address, or other information in order to connect to the wireless access point. The device detection system may also obtain the MAC address of the device connecting to the wireless access point, and the device detection system may associate the connection with pings detected from the device with the same MAC address. A device connecting to the wireless access point may be determined to be more likely to be located within the venue than a device that did not connect to the wireless access point.

The device detection system may determine 450 a dwell time of the device. The dwell time may be the difference between a first time that a ping is detected from the device and a last time that a ping is detected from the device. A longer dwell time may increase the likelihood that the device is located within the venue, as opposed to a shorter dwell time which may indicate that a user of a device walked by the venue without entering the venue.

In some embodiments, the device detection system may start a new set of pings for the device in response to an elapsed time between pings. For example, if the device detection system does not detect a ping for at least five minutes from a device, the device detection system may save previously detected pings from the device as a complete set. Any subsequent pings from the device may be stored as a new set. Thus, if a device leaves the area of the wireless access point and subsequently returns, a first dwell time may be saved for the first set of pings, and a new dwell time may be calculated for subsequently detected pings.

The device detection system determines 460 whether the device was located within the venue. The device detection system may determine whether the device was located within a specific area within the venue. The set of training data for the device detection system may include a footprint or floor layout for a venue. Additionally, the set of training data may include the location of any access points within the venue, the boundaries around any specific areas within the venue, the location of any entrances/exits of the venue, and the location of any structures within the venue. The device detection system evaluates the device parameters to determine whether the device was located within the venue. The device detection system may evaluate the device parameters to determine whether the device was located within a specific area within the venue. In some embodiments, the device detection system may determine a time that a device entered the venue and a time that the device exited the venue. The device detection system may calculate a duration that the device was located within the venue based on the enter and exit times. In some embodiments, a human evaluator may evaluate the device parameters and input a determination of whether the device is located within the venue.

In addition to the signal strength, a connection to the wireless access point, and the dwell time, the device detection system evaluates any additional available device parameters to determine whether or not a device has entered the venue. For example, the device detection system may determine whether the device is a device of an employee. If the device is a device of an employee, it may increase the likelihood that the device is located within the venue. The device detection system may determine whether the pings were detected during open or closed hours of the venue. Pings detected during open hours of the venue may be more likely to be from a device located within the venue than pings detected during closed hours of the venue. In some embodiments, a manufacturer identifier of a MAC address of the device may affect the likelihood that the device was located within the venue. For example, a manufacture identifier may indicate that the device is an automobile, and the device detection system may determine that it is unlikely that a vehicle would be located within the venue. In contrast, a manufacturer identifier may indicate that the device is a mobile phone, and the device detection system may determine that it is likely that the device could be located within the venue. In some embodiments, the device detection system may determine whether a user of the device conducted a transaction at a POS located within the venue. The user may conduct the transaction using the mobile device, or the user may conduct the transaction using a transaction instrument, such as a credit card, and the transaction may be linked to the user of the device. In response to the user of the device conducting the transaction at the POS, the device detection system may determine that it is likely that the device is located within the venue.

The device detection system generates 470 a model based on the device parameters. The model is configured to determine, based on device parameters for pings detected by one or more access points, whether a device is located within the venue. In some embodiments, the model is configured to output a positive or negative indication of whether the device is located within the venue. In some embodiments, the model is configured to output a confidence score indicating a probability that the device is located within the venue. For example, the confidence score may be between 0-100%. In some embodiments, a human evaluator may assign weights to each device parameter to generate a statistical model. In some embodiments, linear regression analysis may be applied to the device parameters to determine which device parameters are most indicative of whether the device was located within the venue. In some embodiments, a machine learning model may be trained based on the device parameters. Ground truth values may be obtained from POS data, employee device data, or human inputs indicating whether a device was actually located within the venue.

In some embodiments, ground truth values may be obtained during closed store hours. All detected pings during closed store hours may be determined be from devices located outside the venue. In some embodiments, exceptions may be made for devices that are authorized to be located within the venue during closed store hours. Device profiles in the device profile store may indicate whether a device is authorized to be located within the venue during closed store hours. For example, employees or contractors, such as security or cleaning staff, may be authorized to be located within the venue during store hours. Additionally, inventory or venue equipment located within the venue that emit pings may be authorized devices. Thus, all detected pings from devices, except for authorized devices, may be determined to be located outside the venue during closed store hours.

Figure 5:
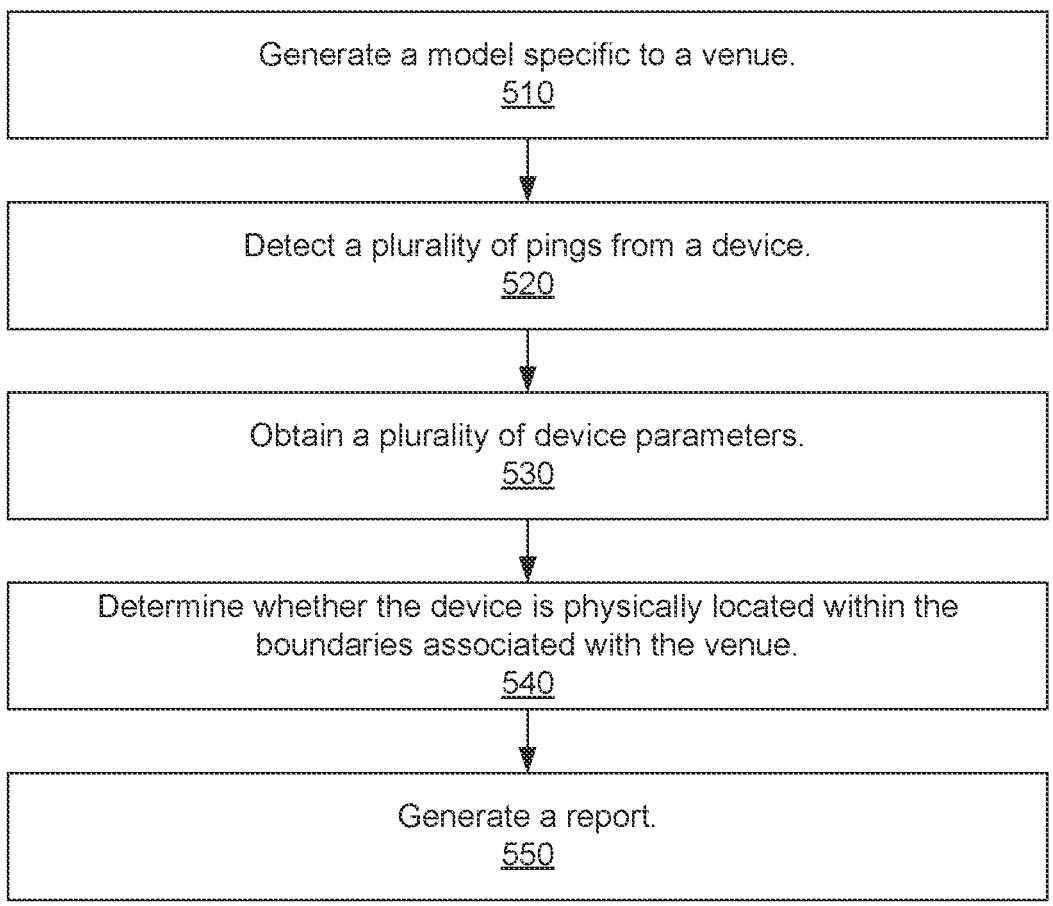
FIG. 5 is a flowchart of a method for detecting a location of a mobile device, according to an embodiment.

FIG. 5 is a flowchart 500 of a method for determining whether a device is located within a venue, in accordance with an embodiment. In some embodiments, the method may be a continuation of the method described with respect to FIG. 4. In various embodiments, the method includes different or additional steps than those described in conjunction with FIG. 5. Further, in various embodiments, the steps of the method may be performed in different orders than the order described in conjunction with FIG. 5. The method described in conjunction with FIG. 5 may be carried out by the device detection system 140 in various embodiments.

The device detection system generates 510 a model specific to a venue. The model may be a machine learning model. The model may be generated in accordance with the method described with reference to FIG. 4. The machine learning model is configured to determine, based on device parameters of a mobile device, whether a mobile device is physically located within boundaries associated with the venue.

The device detection system detects 520 a plurality of pings from a device. The pings may be detected by a wireless access point located within the venue.

The device detection system obtains 530 a plurality of device parameters for the device. Or more of the device parameters may be obtained based on the pings detected from the device. For example, the device parameters may comprise at least one of: a signal strength of a ping, a time of the ping, a dwell time between a first ping and a last ping from a device, whether the ping was received during hours of operation of the venue, or a manufacturer identifier of a MAC address of the device. In some embodiments, one or more of the device parameters may be obtained from a device profile or other data store. For example, the device parameters may comprise at least one of: whether the device is an employee device, whether the device is an authorized device, a signal strength of pings from other devices that connected to the wireless access point, and characteristics of data received from employee devices. The device detection system may cross-reference device parameters against other systems, such as POS systems, reservation systems, and loyalty systems that may provide additional indicators of whether a device was located within a venue.

The device detection system determines 540 whether the device is physically located within the boundaries associated with the venue by applying the machine learning model to the plurality of device parameters. The machine learning model is configured to output a determination of whether the device is physically located within the boundaries. In some embodiments, the output determination may comprise binary determination, such as a yes or no indication of whether the device is located within the boundaries. In some embodiments, the output determination may comprise a confidence score representative of a likelihood that the device is located within the boundaries associated with the venue. In some embodiments, the output determination may comprise a confidence band covering a range of likelihoods that the device is located within the boundaries.

The device detection system generates 550 a report based on the output from the machine learning model. In some embodiments, the report may comprise output determinations for a plurality of devices. For example, the report may list all devices from which a ping was detected during a time period, such as a day. The report may indicate determinations of which of the devices were located within the venue. In some embodiments, the report may comprise an indication of which devices, or which users of devices, received a content item for the venue.

The venue or other analysists may use the report to analyze the traffic within the venue. For example, the report may inform the venue of the number of visitors to the venue, the number of people that walked by the venue without entering, the length of time people spent in the venue, the effectiveness of advertisement campaigns, or other information which may be valuable to the venue.

In some embodiments, the model may be adjusted or retrained based on the report. For example, an analyst may review the generated report, and the analyst may determine that the report is below a desired quality threshold. The analyst may adjust one or more of the device parameters or weights in order to adjust the model. In some embodiments, the analyst may mark an output determination of the machine learning model as incorrect, and the machine learning model may retrain based on the new data.

In some embodiments, the model may be retrained or adjusted in response to a triggering event. In some embodiments, a triggering event may comprise a change in a physical aspect of the venue. For example, in response to the wireless access point being replaced or moved within the store, or in response to the addition or removal of a wireless access point, the model may be retrained. Similarly, in response to a change in location of walls or boundaries of the venue, or in response to a change in-store hours, the model may be retrained. In some embodiments, the model may be retrained periodically, such as once per month or once per year, on an ongoing basis.

The systems and methods described herein provide valuable information to venues describing the presence of users within the venue. By detecting the presence of devices using wireless pings, the systems are able to accurately identify the presence of users within the venue. Additionally, the presence of devices may be detected without users taking any action on the device, such as enabling location or interacting with an application. Furthermore, device presence may be detected three-dimensionally, as opposed to location mechanisms such as GPS, which may provide an identical location of a device on a first story of a building versus the tenth story of the building.

FIG. 6 illustrates an action diagram 600 of a method for integrating a customer's digital history with physical venue visits, according to an embodiment.

The device detection system 120 may transmit 610 a tracking pixel, also referred to as a cookie, to the digital venue system 160. The tracking pixel may comprise a script that causes the digital venue system 160 or the client device 110 to upload tracking data to another party, such as the identity matching server 150 or the device detection system 120. In some embodiments, the device detection system 120 may provide instructions to the digital venue system 160 regarding how to generate the tracking pixel, and the digital venue system 160 may generate the tracking pixel.

The digital venue system 160 transmits 620 the tracking pixel to the client device 110. The digital venue system 160 may transmit the tracking pixel to the client device 110 in response to the client device 110 accessing content provided by the digital venue system 160, such as in response to the client device 110 accessing a website provided by the digital venue system 160. The tracking pixel may be stored in a browser on the client device 110. The tracking pixel may comprise a cookie value, which may be an alphanumeric string that uniquely identifies the client device 110. In some embodiments, the client device 110 may prevent tracking pixels that transmit tracking data to a third party, however, the client device 110 may allow tracking pixels that transmit tracking data to the digital venue system 160 that is providing the content being viewed on the client device 110.

The digital venue system 160 records 630 the tracking data obtained via the tracking pixel. The tracking pixel may allow the digital venue system 160 or other party receiving the tracking pixel data to store browsing history data from the client device 110, such as webpage views, purchases made, clickstream data, etc.

The digital venue system transmits 640 the tracking data to the identity matching server 150. In some embodiments, the tracking data may comprise a cookie value associated with the client device 110, an email address associated with the client device 110, a user name associated with the client device 110, or any other suitable identifier that uniquely identifies the client device 110 or a user associated with the client device 110. The digital venue system 160 may transmit a set of tracking data for each client device 110 that accessed content provided by the digital venue system 160. In some embodiments, for a client device 110, the digital venue system 160 may transmit data indicating which content the client device 110 received, when the client device 110 received the content, how many times the client device 110 received the content, whether the user of the client device 110 interacted with the content (e.g., clicked on a content item, shared the content item, made an online purchase after accessing the content, etc.), or any other suitable data describing the user's interaction with the digital venue system 160.

For each set of tracking data received from the digital venue system 160, the identity matching server 150 may determine whether the identity matching server has a stored user profile corresponding to the client device 110. The user profile may comprise an anonymous identifier generated by the identity matching server 150. If the identity matching server 150 does not have a stored user profile for the client device 110, the identity matching server 150 may create a new user profile and generate a new anonymous identifier. The identity matching server 150 may not share the association between the anonymous identifier and the client device 110 with other entities. In other words, another entity that obtains the anonymous identifier without other identifying information may not be able to identify the client device 110 or user of the client device.

The device detection system 120 detects 650 client devices 110 that have visited a venue. The device detection system 120 may use a model, such as a machine learning model, to detect the client devices 110, as described in detail herein with respect to FIGS. 2-5. For each detected client device 110, the device detection system 120 obtains a device user identifier. The device user identifiers may comprise a MAC address, an email address, a user name, or some other identifier that uniquely identifiers the client device 110 or a user of the client device 110. In some embodiments, the device detection system 120 may obtain user identifiers based on POS data. For example, the device detection system 120 may obtain a user name and zip code based on a POS transaction by a user, and the device detection system 120 may provide the user name and zip code as a device user identifier, or the device detection system 120 may use the user name and zip code to identify a stored device profile, and the device detection system 120 may obtain a device user identifier, such as an email address, from the stored device profile.

In some embodiments, the detected client device 110 may be the same client device 110 which received the tracking pixel from the digital venue system 160. However, a single customer may be associated with multiple client devices 110, such as a cellphone and a laptop computer. In some embodiments, the tracking pixel may have been provided to the customer's laptop computer, and the customer's cellphone may be detected by the device detection system 120.

The device detection system 120 stores a log of each time that the client device 110 is detected. The log may comprise location data describing the time and location of the client device 110 each time the client device is detected within a venue. The log may record the time that the client device 110 was detected, the location within the venue of where the client device 110 was detected, whether a user associated with the client device 110 made a purchase at the venue, an identification of items purchased, or some combination thereof.

The device detection system 120 transmits 660 device user identifiers 650 to the identity matching server 150. The device detection system 120 may collect a set of device user identifiers 660 obtained during a collection period, which may correspond to all or a portion of an entity campaign. The device detection system 120 may also transmit the data stored in the log for each client device 110.

The identity matching server 150 transmits 670 tracking data to the device detection system 120. For each device user identifier received from the device detection system 120, the identity matching server 150 may determine whether the identity matching server has a stored user profile corresponding to the device user identifier. The user profile may comprise an anonymous identifier generated by the identity matching server 150. If the identity matching server 150 does not have a stored user profile for the device user identifier, the identity matching server 150 may create a new user profile and generate a new anonymous identifier. For each set of device user identifiers received from the device detection system 120, the identity matching server 150 may correlate the log data received from the device detection system 120 with the tracking data received from the digital venue system 160. The identity matching server 150 transmits a corresponding set of anonymous identifiers to the device detection system 120 with the log data and the tracking data. However, the identity matching server 150 does not indicate which anonymous identifier corresponds to which device user identifier.

In some embodiments, the device detection system 120 may receive the tracking data directly from the digital venue system 160 or the client device 110. The device detection system 120 may map the tracking data obtained via the tracking pixel with the device user identifiers detected by the device detection system 120. For example, the customer associated with the client device 110 may grant permission to the digital venue system 160 to share identifying information, such as a MAC address or email address, with the device detection system 120 that allows the device detection system 120 to map the tracking data to the device user identifier.

The device detection system 120 may generate 680 a customer journey timeline describing the online and in-store actions performed by each customer associated with each anonymous identifier. The device detection system 120 may provide the customer journey timeline to an entity associated with a venue. The customer journey timeline may describe the sequence of a customer's online history and the customer's visits to a physical venue. For example, the customer journey timeline may indicate that a customer visited a website provided by the digital venue system 160 multiple times and subsequently visited a physical venue. Similarly, the customer journey timeline may indicate that a customer visited a physical venue, then subsequently made a purchase from a web site provided by the digital venue system later the same day. The customer journey timeline may comprise demographic information describing the customers that visited a website and the customers that visited a venue before or after visiting the website. The demographic information of customers that visited a website before visiting a physical venue may be significantly different than the demographic information of customers that visited a physical venue before visiting a website associated with the venue. Thus, for an entity attempting to drive foot traffic to a venue with a campaign, the customer data describing interaction with a website may be less valuable than the customer data describing visits to the venue. In some embodiments, the customer journey timeline may indicate the number of new customers that visited a venue after visiting a website associated with the venue. The customer journey timeline may describe the durations between customers visiting a website and subsequently visiting a venue.

In some embodiments, the device detection system 120 may transmit multiple sets of device user identifiers to the identity matching server 150 and receive multiple corresponding sets of anonymous identifiers and tracking data over time. Each time a specific client device 110 is detected by the device detection system 120, the device detection system 120 may receive the same anonymous identifier from the identity matching server 150. Thus, the device detection system 120 may identify anonymous identifiers that visit a venue multiple times, and the customer journey timeline may describe the number and timing of venue visits for a client device 110 corresponding to an anonymous identifier. A customer that visits a venue once and subsequently makes multiple purchases via a website for the venue may be determined to have a greater value to an entity than a customer that visits a venue and subsequently visits a website once without making a purchase, thus the customer journey timeline may indicate which customers may be more likely to make future purchases, either online or in person at a venue. The entity may use such information for future campaigns to more effectively target content items to customers. For example, the entity may determine which content shown to a customer on a website was more likely to lead to the customer visiting a venue.

In some embodiments, the customer journey timeline may segregate information based on a specific venue visited by a customer. For example, one entity conducting a campaign may be associated with multiple physical venues. The device detection system 120 may detect devices in multiple venues and determine which anonymous identifiers correspond to client devices 110 that visited which specific venue. Thus, an entity may be able to determine which specific venues received visits resulting from a customer visiting a website.

In some embodiments, the digital venue system 160 may modify a website based on the customer journey timeline. For example, an entity associated with a digital venue system 160 may determine which version of a website was more likely to result in a customer visiting a venue and making a purchase. In some embodiments, the digital venue system 160 may provide different versions of the website to different demographic groups based on the customer journey timeline. For example, a first version of the website may be more effective in driving a first age demographic to a venue, and a second version of the website may be more effective in driving a second age demographic to a venue. Similarly, customers in different geographic areas may receive different website content based on the relative effectiveness of website content driving customers to visit a physical venue in their respective geographic area.

In some embodiments, the customer journey timeline may indicate that certain demographic sectors are more or less likely to make a purchase online or at a physical venue. Thus, the digital venue system 160 may provide digital content based on the identified purchasing trends. For example, for a given demographic that is more likely to make a purchase online, the digital venue system 160 may tailor digital content that encourages a customer to make a purchase online, such as providing a digital coupon for use at a website provided by the digital venue system 160. Conversely, for a given demographic that is more likely to make a purchase at a physical venue, the digital venue system 160 may provide a coupon that is redeemable at a physical venue.

An entity associated with the venue may tailor marketing campaigns based on the customer journey timelines. In addition to modifying content provide to a customer via the digital venue system 160, the entity may provide content items to a content distribution system for distribution to customers. The content distribution system may provide the content items to one or more client devices 110. The content items may comprise digital advertisements, articles, videos, images, or any other suitable type of digital information which may be presented on a client device 110. The content items may be provided as part of a campaign on behalf of the entity. The entity may instruct the content distribution system to target the content items to a set of users that meet targeting criteria. For example, the targeting criteria may be defined by demographic information. In some embodiments, the targeting criteria may be partially determined based on previous user visits. For example, the device detection system 120 may provide a list of user identifiers for client devices 110 that have previously visited a venue, and the targeting criteria may exclude users that have previously visited a venue. Thus, the campaign may be targeted only to new customers of an entity in order to increase new user visits. Conversely, a campaign may be targeted to existing customers in order to increase repeat visits.

In some embodiments, future content may be provided to any client device associated with a customer. For example, based on an anonymous identifier associated with a device determined to have been located within the venue, subsequent content may be provided to any device associated with the anonymous identifier.

The systems described herein provide valuable insight to entities regarding the complete journey of customers including physical venue visits and online activity. The entities may use such information to modify digital content provided to the customers by the entity and subsequent campaigns to more effectively increase foot traffic to their venues.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A non-transitory computer readable storage medium comprising stored instructions, the instructions when executed cause at least one processor to:
    transmit a tracking pixel to a digital venue system, wherein the tracking pixel is configured to obtain tracking data from a client device for transmission to an identity matching server;
    detect a ping from a device received by a wireless access point of a venue;
    determine, based on the ping, that the device is located within the venue by applying a machine-learned model trained based at least in part on a boundary of the venue and configured to determine whether or not the device is located within the boundary of the venue based on one or more of a plurality of device parameters associated with the detected ping;
    obtain a device user identifier associated with a user of the device;
    transmit the device user identifier to the identity matching server;
    receive, from the identity matching server, an anonymous identifier corresponding to the device user identifier;

receive, from the identity matching server, the tracking data obtained via the tracking pixel;

generate a customer journey timeline for the user describing the tracking data and the detection of the device within the venue; and select, for a website visited by the user of the device, a version of the website from a plurality of website versions to display to a different visitor to the website based on the customer journey timeline.

2. The non-transitory computer readable storage medium of claim 1, wherein the digital venue system transmits the tracking data to the identity matching server.

3. The non-transitory computer readable storage medium of claim 1, wherein the plurality of device parameters comprise at least one of: a signal strength of the ping, a time of the ping, a dwell time between a first ping and a last ping from the device, hours of operation of the venue, a signal strength of pings from devices that are connected to the wireless access point, a manufacturer identifier of MAC address, or employee device data.

4. The non-transitory computer readable storage medium of claim 1, wherein the identity matching server converts the device user identifier into a corresponding anonymous identifier.

5. The non-transitory computer readable storage medium of claim 1, wherein the instructions when executed cause the at least one processor to determine a number of times that the user visited the venue after receiving content corresponding to the venue.

6. The non-transitory computer readable storage medium of claim 1, wherein the tracking data describes webpages displayed to the client device by the digital venue system.

7. The non-transitory computer readable storage medium of claim 1, wherein the instructions when executed cause the at least one processor to:
determine, based on the ping, a MAC address of the device; and
obtain the device user identifier based on the MAC address of the device.

8. A method comprising:
transmitting a tracking pixel to a digital venue system, wherein the tracking pixel is configured to obtain tracking data from a client device for transmission to an identity matching server;
detecting a ping from a device received by a wireless access point of a venue;
determining, based on the ping, that the device is located within the venue by applying a machine-learned model trained based at least in part on a boundary of the venue and configured to determine whether or not the device is located within the boundary of the venue based on one or more of a plurality of device parameters associated with the detected ping;
obtaining a device user identifier associated with a user of the device;
transmitting the device user identifier to the identity matching server;
receiving, from the identity matching server, an anonymous identifier corresponding to the device user identifier;
receiving, from the identity matching server, the tracking data obtained via the tracking pixel;
generating a customer journey timeline for the user describing the tracking data and the detection of the device within the venue; and
selecting, for a website visited by the user of the device, a version of the website from a plurality of website versions to display to a different visitor to the website based on the customer journey timeline.

9. The method of claim 8, wherein the digital venue system transmits the tracking data to the identity matching server.

10. The method of claim 8, wherein the plurality of device parameters comprises at least one of: a signal strength of the ping, a time of the ping, a dwell time between a first ping and a last ping from the device, hours of operation of the venue, a signal strength of pings from devices that are connected to the wireless access point, a manufacturer identifier of MAC address, or employee device data.

11. The method of claim 8, wherein the identity matching server converts the device user identifier into a corresponding anonymous identifier.

12. The method of claim 8, further comprising determining a number of times that the user visited the venue after receiving content corresponding to the venue.

13. The method of claim 8, wherein the tracking data describes webpages displayed to the client device by the digital venue system.

14. The method of claim 8, further comprising:
determining, based on the ping, a MAC address of the device; and
obtaining the device user identifier based on the MAC address of the device.

15. A non-transitory computer readable storage medium comprising stored instructions, the instructions when executed cause at least one processor to:
detect a ping from a first client device associated with a user received by a wireless access point located within a venue associated with an entity;
determine, based on the ping, location data indicating that the first client device is located within the venue by applying a machine-learned model trained based at least in part on a boundary of the venue and configured to determine whether or not the first client device is located within the boundary of the venue based on one or more of a plurality of device parameters associated with the detected ping;
receive, from the entity, online tracking data of the user obtained via a tracking pixel on a second client device associated with the user;
map the location data for the first client device to the online tracking data for the second client device;
generate a customer journey timeline describing the location data and the online tracking data; and
select, for a website visited by the user of the first client device, a version of the website from a plurality of website versions to display to a different visitor to the website based on the customer journey timeline.

16. The non-transitory computer readable storage medium of claim 15, wherein the instructions when executed cause the at least one processor to:
determine, based on the ping, a MAC address of the first client device; and
obtain an email address based on the MAC address of the first client device.

17. The non-transitory computer readable storage medium of claim 15, wherein the instructions when executed cause the at least one processor to transmit the tracking pixel to the entity.

18. The non-transitory computer readable storage medium of claim 15, wherein the instructions when executed cause the at least one processor to train the machine-learned model using a training set of data including pings by identifying a positive training set of pings that have been determined to be received from a device located within the venue, and a negative training set of data including pings that have been determined to be received from a device not located within the venue.

* * * * *